455-613 AU 233 EX

XR 3,825,896

United States Patent [19]

Obenhaus

[11] 3,825,896

[45] July 23, 1974

[54] COMPUTER INPUT/OUTPUT INTERFACE SYSTEMS USING OPTICALLY COUPLED ISOLATORS

[75] Inventor: Robert E. Obenhaus, South Easton, Mass.

[73] Assignee: Texas Instruments Incorporated, Dallas, Tex.

[22] Filed: May 1, 1972

[21] Appl. No.: 249,021

[52] U.S. Cl. .......................... 340/147 R, 340/166 EL

[51] Int. Cl. .......................... H03k 17/56

[58] Field of Search .................. 340/147 R, 166 EL; 250/213 A; 307/311

[56] References Cited

UNITED STATES PATENTS

| | | | |
|---|---|---|---|
| 3,207,907 | 9/1965 | Clark | 250/213 A |
| 3,211,900 | 10/1965 | Bray | 250/213 A |
| 3,321,631 | 5/1967 | Biard | 250/213 A |
| 3,462,606 | 8/1969 | Case | 250/213 A |
| 3,463,928 | 8/1969 | Murphy | 307/311 X |
| 3,476,941 | 11/1969 | Bonin | 307/311 X |
| 3,655,988 | 4/1972 | Nakamura | 250/213 A X |
| 3,723,769 | 3/1973 | Collins | 307/311 X |
| 3,742,947 | 7/1973 | Hashem | 307/311 X |

*Primary Examiner*—Harold I. Pitts

*Attorney, Agent, or Firm*—Harold Levine; Rene Grossman; T. G. Devine

[57] ABSTRACT

An input/output interface system for a digital computer utilizes an optically coupled isolator which provides electrical isolation between an external device and the computer. The signal from the external device may be of either A.C. or D.C. form, and the interface system output signal is a logic signal compatible with the I/O logic of the computer. The preferred optically coupled isolator comprises a light emitting diode which is selectively positioned with respect to a photo transistor, such that the diode and photo transistor are physically, and thus electrically, spaced apart but are optically coupled together. A current input signal passing through the light emitting diode causes the diode to radiate, the radiation being received at the base of the photo transistor, which then produces a logic signal indication. In an output interface circuit, the light emitting diode is connected to receive the digital output of the computer and the output of the photo transistor drives a gating circuit which gates power to a load. The interface circuits are particularly adaptable for use in computerized control systems wherein external devices are monitored or controlled.

10 Claims, 2 Drawing Figures

COMPUTER INPUT/OUTPUT INTERFACE SYSTEMS USING OPTICALLY COUPLED ISOLATORS

CROSS REFERENCES TO RELATED APPLICATIONS

The subject of this invention is related to application Ser. No. 249,022, filed concurrently herewith, entitled THRESHOLD MONITORING SYSTEM, by the same inventor and assigned to the assignee of this invention.

BRIEF SUMMARY OF THE INVENTION

This invention relates to digital computer I/O interface systems, and more particularly to optically coupled digital computer I/O interface systems.

In computerized control systems it is frequently desirable to interface a high level voltage to a much lower level logic input to a digital computer or other digital device. For example, an A.C. line voltage may need to be interfaced. One common technique for interfacing such higher level voltages is by means of transformer coupling. The transformer provides voltage matching and a substantial degree of isolation may be provided by filtering or clipping on both sides of the transformer. However, such an arrangement is quite bulky and expensive and is not fully dependable or reliable.

It has been recognized that optical techniques may be utilized to provide electrical isolation in I/O interface systems. Conventional optical interface systems employ incandescent or neon lamps which produce light energy when a current is passed therethrough. However, these lamps are subject to deterioration and cannot be depended upon for long term reliability. Additionally incandescent lamps in particular are slow in response due to inherent thermal inertia of the tungsten filaments. Existing systems employing incandescent lamps may require several electrical cycles, even at a 60 cycle frequency, to extinguish after the cutoff signal is made. This presents a substantial problem in high speed control systems where several rapid sequential operations are required.

In general, existing interface systems suffer from one or more of various defects including slow speed, large space utilization, high power consumption, inflexibility of utilization, difficulty in maintenance and unreliability.

Accordingly, this invention includes an interface system which employs a radiation emissive semiconductor device optically coupled to a radiation sensitive semiconductor device. Such a system enables high speed performance, utilizes very little space, is low on power consumption, has a wide range application, is highly reliable and may be easily maintained. A feature of the invention is its ability to directly interface with either low level (for example, 3 to −5 volts) or high level (for example, around 20 volts) logic systems without circuit modifications. A high voltage input signal is successfully matched to a low voltage logic input while maintaining electrical isolation. The logic input to the computer is maintained substantially non-susceptible to line transient effects. The resulting interface circuits are modularly designed such that a single module may be utilized to interface with each device.

A preferred input interface system is adaptable for interfacing A.C. machines to a computer. When an A.C. machine is turned on, the line voltage supplies current to a light emitting diode such that a logic signal representation is supplied at the collector of an optically coupled photo transistor to tell the computer that the machine is on. The logic signal will be in the opposite condition when the machine is off. The preferred output interface system is adaptable to control the status (for example, on or off) of externally connected devices in response to a logic signal from the computer. The computer logic signal supplies current to the light emitting diode such that the collector of the photo transistor will be drawing current when the logic signal is high. The photo transistor is coupled through a full wave diode bridge rectifier to a self-gated triac, which controls the flow of A.C. line power to a load, i.e., to the externally connected device. In both the input and output interface systems an indicator lamp may be provided to indicate the status of the external device.

BRIEF DESCRIPTION OF THE DRAWINGS

The present invention, as well as further objects and advantages thereof, may be more fully understood from the following detailed description of preferred embodiments in conjunction with the drawings, in which.

DESCRIPTION OF THE PREFERRED EMBODIMENT

Figure 1:
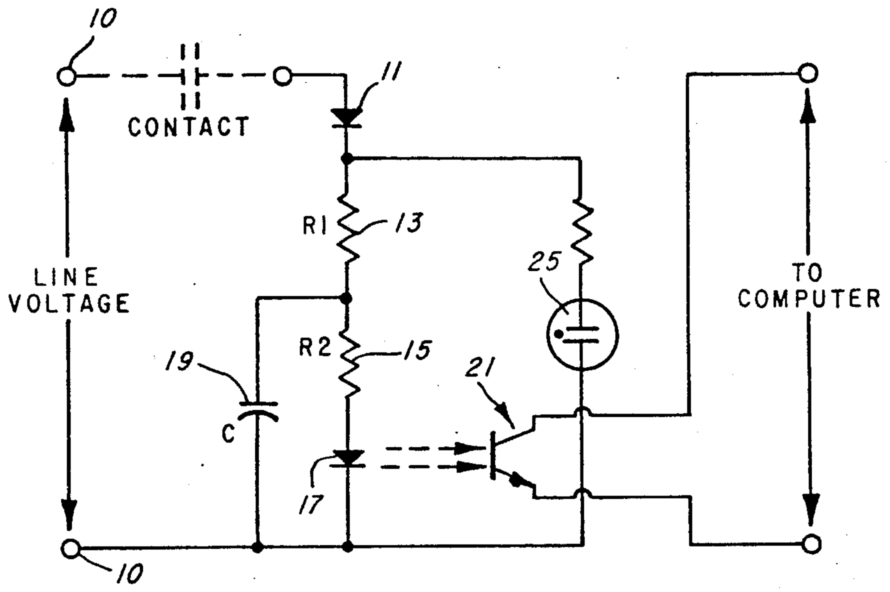
FIG. 1 is a schematic diagram of a preferred input interface system.

Referring now to the drawings, FIG. 1 illustrates a preferred embodiment of an input interface system embodying this invention. The embodiment of FIG. 1 is particularly adaptable to interface an on/off switched 115 volt A.C. signal to the input of the computer. The 115 volt A.C. signal is received across input terminals 10. The existence of the A.C. signal may indicate that an externally connected device is currently turned on, whereas the nonexistence of the signal may indicate that the device is turned off.

The A.C. signal current passes in series through diode 11, resistor 13 (R1), resistor 15 (R2) and light emitting diode (LED) 17 to the common potential. The current through LED 17 causes the diode to radiate and this radiation is received at the base terminal of photo transistor 21, which is selectively positioned to be optically coupled to the LED. The received radiation causes the photo transistor 21 to switch on. A logic signal representation is thus available at the collector of the photo transistor to indicate that the A.C. signal is present, i.e., that the external device is turned on.

The diode 11 serves a dual purpose. First, the diode half-wave rectifies the incoming A.C. signal such that only the positive peaks are passed on to the LED 17. Secondly, diode 11 is selected such that its peak inverse voltage (PIV) rating is sufficiently high to withstand the maximum peak voltage available on the incoming line, thus protecting the LED, which typically has a relatively low PIV rating.

The series resistance comprising resistor 13 plus resistor 15 (R1 + R2) is selected such that the input current passing through the light emitting diode will be limited. However, the input current should be enough to produce radiation sufficient to saturate photo transistor 21. The capacitor 19 connected at the common point between resistors R1 and R2 provide D.C. filtering. If the capacitor were connected directly across the LED terminals, the discharge time constant would be too short to allow adequate filtering. The ratio of resistors R1 and R2 is selected such as to provide a balance between a charging time constant RIC and a discharging time constant R2C. When properly selected, the LED will remain lighted during the non-conducting half cycle of the rectified A.C. signal and thus prevent flickering. Thus the photo transistor 21 is turned on in the saturation mode and a constant D.C. logic level voltage is supplied at the collector of the photo transistor 21.

Photo transistor 21 is to be operated in a saturated mode, such that it remains fully saturated when radiation is being received from the LED 17. This enables a constant D.C. voltage to be available at the collector. The photo transistor 21 is matched to the LED 17 such that a relatively low intensity radiation from the LED 17 will saturate transistor 21. Because the LED begins to radiate at a level well below its maximum current capability, the series resistance comprising R1 + R2 may be selected to restrict operation to the low power region of the LED. This ensures a practically unlimited life while virtually eliminating the possibility of thermal run away. In contrast with other electro-optics systems, the resulting unit has no incandescent or neon lamp to degrade with time.

Line voltage transient immunity is virtually assured by the circuit of FIG. 1. The capacitor C is extremely effective in by-passing line transients around the LED. Also, the integrating network comprising R1C ensures that the major transient voltage drop occurs across resistor R1. Further, the LED - photo transistor combination provides a total response speed in the high kilohertz region, and thus provides immunity from transients in the mega-hertz frequency region.

To provide a visual indication that an input signal has been received, neon lamp 25 may be connected across the incoming signal line. In process control applications, this will enable a system operator to visually observe a sequence of events by observing which circuits are active in a particular group.

Electrical isolation is provided by, and is a function of, the physical spacing between LED 17 and photo transistor 21. Approximately a 1,000 volt isolation is adequate for most interfacing situations. Even with 1,000 volt isolation spacing, the system density for the interface system is quite high, enabling a plurality of interface modules to be closely packed in an array for interfacing a plurality of devices with a computer system.

The collector of the photo transistor 21 can typically be connected directly to either a low level or high level logic system without circuit modifications. Since the photo transistor is a current operated device, it will handle a broad range of currents when conducting, and the respective switching currents of various logic level systems is frequently near the same.

Figure 2:
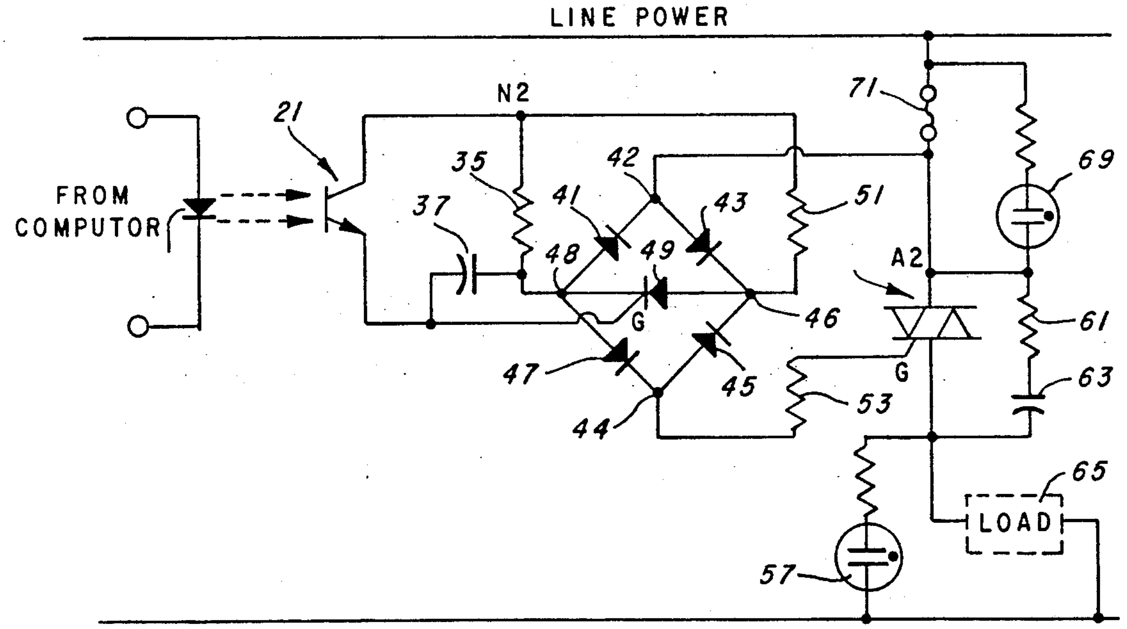
FIG. 2 is a schematic diagram of a preferred output interface system.

Referring now to FIG. 2, the schematic illustrates an output interface circuit which may enable a computer to control the status of an external device. The optically coupled isolator comprising LED 17 and photo transistor 21 may be identical to the isolator of FIG. 1. A logic condition signal applied from the computer causes current to flow through LED 17, thereby causing radiation to be emitted and received at the base terminal of photo transistor 21. As radiation is received, the photo transistor 21 is rendered conductive.

The circuit of FIG. 2 will supply A.C. power to the load 65 when a predetermined logic condition signal is supplied to the diode 17. When photo transistor 21 is conducting, the silicon controlled rectifier (SCR) 49 is switched on by the potential appearing at its gate terminal G. The SCR 49 in conjunction with the diode bridge comprised of diodes 41, 43, 45, and 47 enables self-gating of the triac 59. Power supplied at node A2 from the A.C. line is partially bled off through the diode bridge and SCR to the gate terminal G of the triac 59, thus gating the triac on such that power is transferred to the load 65.

In operation, when the A.C. signal is positive at A2, the diode 43 will conduct, and if photo transistor 21 is conducting, the SCR 49 will conduct, and diode 47 will conduct, thus completing a circuit path through resistor 53 to the gate terminal of the triac 59. This gates the triac on and connects the load through to the A.C. power line. Then, when the A.C. signal appearing at A2 goes negative, diode 41, SCR 49, and diode 45 complete a circuit path through resistor 53 to gate the triac 59 on. Thus, triac 59 passes the electrical A.C. signal without rectification, so long as the SCR 49 is conductive, i.e., as long as the photo transistor 21 is conducting in response to the logic signal appearing at the LED 17. When the SCR is not conducting, corresponding to the opposite logic condition of the LED input signal, the triac cannot conduct, such that the load 65 is cut off from the power line.

The circuit of FIG. 2 is self-biasing such that the photo transistor 21 is continuously biased on by a positive potential appearing at node N2, thereby enabling it to conduct at any time radiation is received at the base terminal. When the SCR 49 is nonconducting, an A.C. potential appears across the diode bridge at nodes 42 and 44. The diode bridge full wave rectifies this A.C. potential such that a D.C. potential appears across nodes 46 and 48. The resistors 35 and 51 serve as a voltage divider to limit the voltage potential at N2 to a safe operating level for the photo transistor. Thus, a positive voltage potential is continuously available at the node N2, so that at the instant radiation is detected at the base terminal of photo transistor 21, it is rendered conductive and will switch the SCR 49 on, thereby gating on the triac 59 and coupling the load to the A.C. line power. In this manner the status of on/off devices may be directly controlled according to the logic condition of an output signal from the computer.

The circuit of FIG. 2 includes two filters for suppression of line transient effects. The capacitor 37, which is connected from the cathode to the gate of the SCR 49, provides protection from false triggering of the SCR. The resistor 61 connected in series with the capacitor 63 provides a derivative network which minimizes dv/dt triggering of the triac.

A fuse 71 may be provided to prevent the load 65 from drawing excessive power from the line. A neon indicator light 69 is connected across the fuse 71 to indicate when the fuse 71 has been blown. A second neon light 57 may be connected directly across the load terminals to indicate that power is currently being provided to the load. These neon indicator lights enable the operator to continuously observe the status of a plurality of external devices under computer control.

The output interface circuit of FIG. 2 may be readily modified for control of devices (e.g., clutches or brakes) which require a D.C. power supply. The insertion of a full wave bridge rectifier between triac 59 and the load 65 will readily convert the A.C. power signal to a D.C. signal.

A notable feature of this aspect of the invention is that the control power for the triggering circuit is derived from the periodic voltage appearing across the triac, thus avoiding the necessity of a second power supply for this circuit.

The interface systems of this invention are particularly adaptable to interconnection with a digital computer having single addressable bit I/O characteristics, such as the TI—960 computer manufactured by Texas Instruments Incorporated. The single bit addressing characteristic of the TI—960 is described in continuation U.S. Pat. application Ser. No. 178,804, filed Sept. 8, 1971 by George P. Shuraym and assigned to the assignee of this invention. In summary, the TI—960 has a communication register I/O channel with the capability of determining the condition of each bit position within the I/O channel. Thus, an interface system of the type illustrated in FIG. 1 or FIG. 2 may be connected directly to each bit position within the I/O channel such that the computer may determine or control the status of a plurality of external devices by means of addressing a specific bit position in the communication register. However, the interface circuits may also be utilized in conjunction with general purpose digital computers which are limited in I/O to a word or byte. In such case, conventional software is available for determining the condition of a specific bit within the I/O word or byte.

The present invention having been described in connection with specific embodiments thereof, it is to be understood that the description herein is intended only as illustrative of the principal features of the invention.

What is claimed is:

1. A circuit for interfacing a digital computer with an external machine, comprising:

a. first resistive means coupled to receive an electrical signal indicative of the status of the external machine;
b. second resistive means coupled to the output of the first resistive means;
c. capacitive means connecting the junction of the first and second resistive means to a reference potential;
d. radiation emissive semiconductor means connected to the output of the second resistive means, responsive to the electrical signal to emit radiation according to the status of the external machine; and
e. a phototransistor optically coupled to the radiation emissive semiconductor means and adapted to produce a logic signal having a logic condition indicative of the status of the external machine.

2. The system of claim 1 wherein said external machine is an on/off switched machine the status of which is indicated by said electrical signal such that a first logic condition of said logic signal indicates that said external machine is on and a second logic condition thereof indicates that said external machine is off.

3. The system of claim 1 wherein said radiation emissive semiconductor means is a light emitting diode.

4. The system of claim 3 wherein said electrical signal is an A.C. signal, said system further including rectifying means for half wave rectifying said A.C. signal.

5. The system of claim 4 wherein the first and second resistive means and the capacitive means are selected to cause the time to charge the capacitive means through the first resistive means to be balanced by the time to discharge the capacitive means through the second resistive means, causing the light emitting diode to continue emitting during the non-conducting half cycle of the rectified AC signal.

6. The system of claim 5 further including visual indicator means for indicating to an operator the status of said external machine.

7. An emission sensitive circuit for interfacing a digital computer with an external machine, the computer having a radiation emissive semiconductor means coupled thereto to receive from the computer a logic signal indicative of a desired status of the external machine, and responsive to emit radiation according to a predetermined logic condition of the logic signal comprising:

a. a phototransistor optically coupled to the radiation emissive semiconductor means and operative to be switched on by radiation;
b. a diode bridge rectifier;
c. an SCR connected across first and second terminals of the rectifier, and having a gate terminal connected to the emitter of the phototransistor;
d. a control signal line; and
e. a triac having an input terminal coupled to the control signal line and coupled to a third terminal of the rectifier, a gate terminal coupled to a fourth terminal of the rectifier and an output terminal coupled to the external machine, the control signal thereby providing power to the emission sensitive circuit.

8. The circuit of claim 7 wherein said control signal is an A.C. power signal, said circuit further comprising first and second resistors respectively connecting said first and second terminals of said rectifier to the collector of said photo transistor.

9. The system of claim 8 wherein said radiation emissive semiconductor means is a light emitting diode.

10. The system of claim 9 further including visual indicator means for indicating to an operator the status of said external machine.

* * * * *